UNITED STATES PATENT OFFICE.

JOSEF ROUBAL, OF PRAGUE, AUSTRIA-HUNGARY.

ELECTRIC-ARC-LAMP CARBON.

SPECIFICATION forming part of Letters Patent No. 559,752, dated May 5, 1896.

Application filed December 27, 1895. Serial No. 573,506. (No model.)

*To all whom it may concern:*

Be it known that I, JOSEF ROUBAL, a subject of the Emperor of Austria-Hungary, residing at Prague, Bohemia, Austria-Hungary, have invented certain new and useful Improvements in the Manufacture of Electric-Arc-Lamp Carbons, of which the following is a specification.

It is well known that the voltaic electric-light arc, in passing from one carbon point to the other, carries along with it carbon particles, some of which are unconsumed and are scattered. This and the oxidation of the incandescent carbon points prevent the entire and full utilization of the carbons and cause the positive carbon to be pointed in the shape of a cone, resulting in an unsteady or flickering light. If, however, carbons are used which are not readily oxidized on the surface, then the positive carbon point will assume a round and almost cylindrical shape, and the arc will remain at the center and a steady light will be obtained.

The object of my invention, therefore, is to prepare the carbons in such a manner that they will not readily oxidize on the surface. For this purpose I treat the carbon with a silicate. Silicic acid would be preferable excepting that it does not exist in soluble form. I therefore employ a silicate, preferably one of the silicates of the alkalies, (water-glass.) The carbons are soaked in a mixture of equal parts of pure carbon and a silicate (preferably a silicate of an alkali) and are then dried rapidly. The silicate combines intimately with the surface of the carbon and the latter is thus incrusted. Carbons for weaker currents should be soaked in solutions of boric acid. The incrusting can be produced by applying the mixture by means of a brush or by many other suitable ways besides soaking, and the silicate may be thinned as may be necessary.

Having thus described my invention, what I claim as new, and desire to secure by Letters Patent, is—

1. The process of treating electric-arc-light carbons, to prevent the oxidation on the surface while burning and thereby lengthen the burning-time of the carbon, consisting in coating and incrusting the carbon with a mixture of pure carbon and a silicate (preferably silicate of an alkali) or boric acid, substantially as herein set forth.

2. An electric-arc-light carbon the surface of which is incrusted with a mixture of pure carbon and a silicate (preferably water-glass) or boric acid, substantially as set forth.

In testimony that I claim the foregoing as my invention I have signed my name in presence of two subscribing witnesses.

JOSEF ROUBAL.

Witnesses:
 HENRY SCHMOLKE,
 JOSEF VORTHEL.